April 23, 1957 A. C. FIELDS 2,789,657
ELECTROSTATIC PRECIPITATORS
Filed Nov. 30, 1954 2 Sheets-Sheet 1
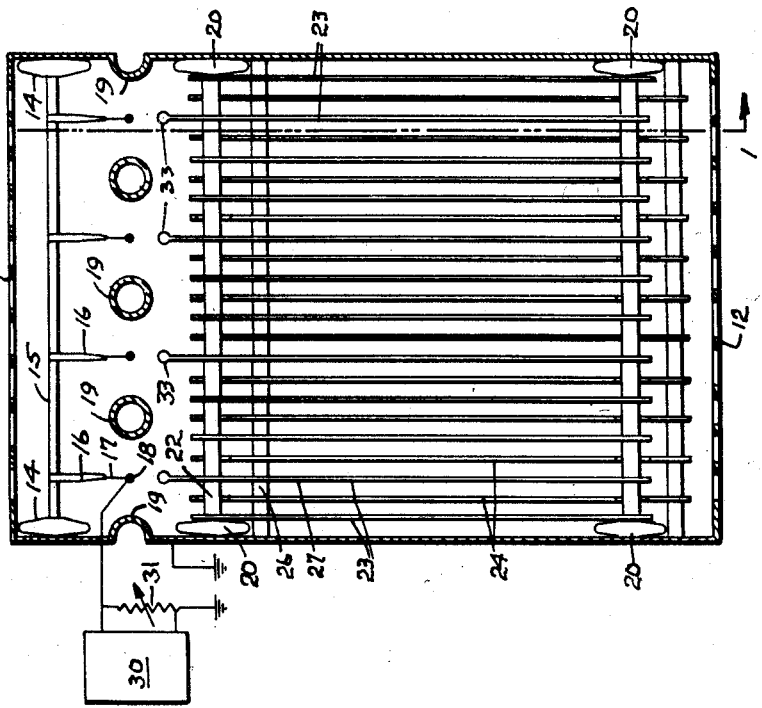
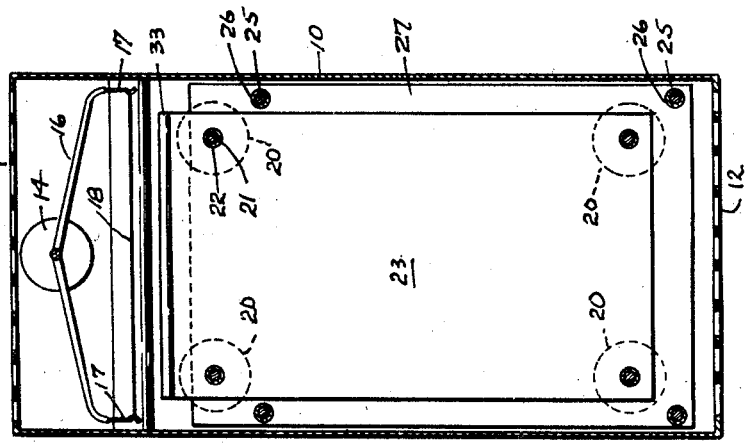
INVENTOR.
ARNOLD C. FIELDS
BY Robert J. Palmer
Attorney April 23, 1957  A. C. FIELDS  2,789,657
ELECTROSTATIC PRECIPITATORS
Filed Nov. 30, 1954  2 Sheets-Sheet 2
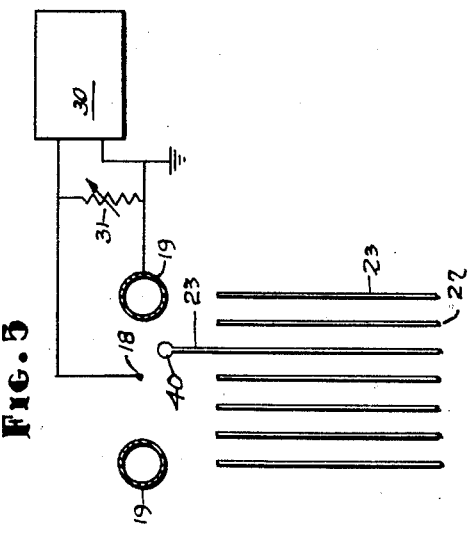
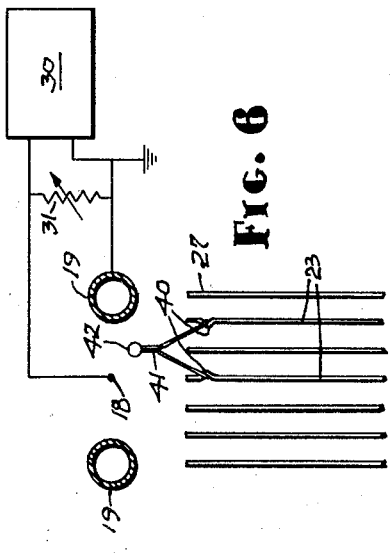
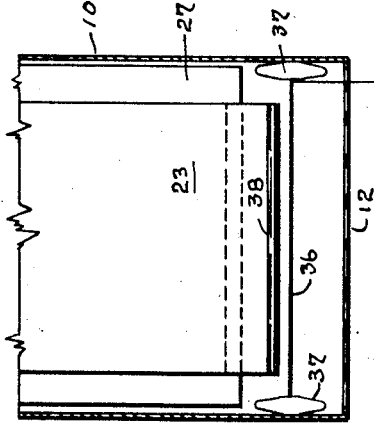
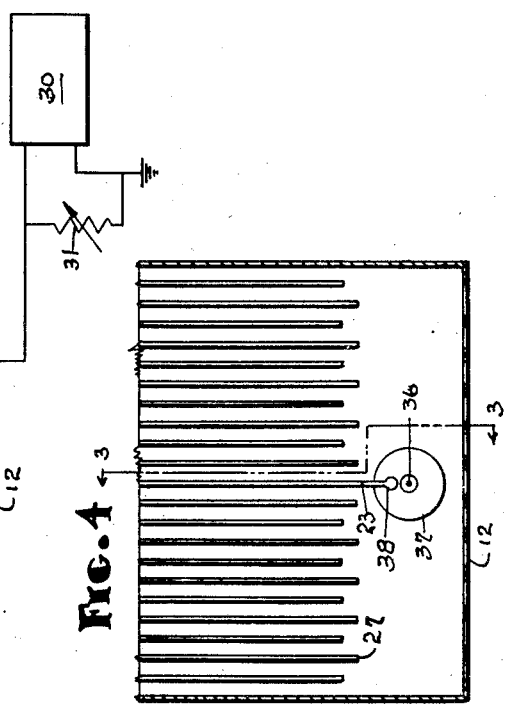
INVENTOR.
ARNOLD C. FIELDS
BY Robert J. Palmer
Attorney

2,789,657

ELECTROSTATIC PRECIPITATORS

Arnold C. Fields, Medfield, Mass., assignor to Westinghouse Electric Corporation, East Pittsburgh, Pa., a corporation of Pennsylvania Application November 30, 1954, Serial No. 472,075

8 Claims. (Cl. 183—7)

This invention relates to electrostatic precipitators for removing small foreign particles such as dust from gases such as air.

Many commonly used electrostatic precipitators for cleaning air have separate ionizer and collector electrodes, and have power packs which deliver two different voltages, one for the ionizer electrodes, and the other for the collector electrodes. A typical ionizer voltage is 12 kv. direct current, and a typical collector voltage is 6 kv. direct current. Such power packs are relatively costly since they usually require two voltage doubling rectifier tubes, and two high voltage capacitors. Some precipitators have been designed to use a single direct current voltage, about 10 kv. for both the ionizer and collector. Experience has shown that this voltage is insufficient for efficient ionization, and is too high for proper collection since in order to avoid spark-over it has been necessary to space the collector electrodes too far apart for efficient collection.

This invention enables a relatively high ionizer voltage and a relatively low collector voltage to be provided using an inexpensive single voltage power pack. The single, direct current voltage from the power pack is supplied to the ionizer electrodes, and a lower voltage for the collector electrodes is derived from the ionizer.

An object of this invention is to reduce the manufacturing costs of electrostatic precipitators without decreasing their efficiencies.

This invention will now be described with reference to the annexed drawings, of which:

Fig. 1 is an end section of an electrostatic precipitator embodying this invention;

Fig. 2 is a side section of the precipitator;

Fig. 3 is an end section of the lower portion of another precipitator, taken along the line 3—3 of Fig. 4;

Fig. 4 is a side section of Fig. 3;

Fig. 5 is a partial side view of another embodiment of this invention, and

Fig. 6 is a partial side view of still another embodiment of this invention.

Referring first to Figs. 1 and 2, the precipitator there illustrated has a casing 10 with an air inlet 11 and an air outlet 12. Disc-shaped insulators 14 are attached to the inner surfaces of the opposite sides of the casing adjacent the inlet 11, and have a metal rod 15 extending therebetween. Metal ionizer wire supports 16 are attached to the rod 15 and have attached thereto the small ionizer wire supporting rods 17 of spring metal. The ionizer wires 18 are supported by the rods 17. Non-discharging ionizer electrodes 19 are arranged on opposite sides of the wires 18, the inner electrodes 19 being metal tubes, and the outer electrodes 19 being inwardly protruding semi-cylindrical portions of the casing walls.

Disc-shaped insulators 20 are attached to the end walls of the casing, and have tie rods 21 extending therebetween. Spacers 22 extend around the tie rods in contact with charge collector plates 23 and pass through clearance openings in ground collector plates 24. Tie rods 25 extend between end walls of the casing, and have spacers 26 therearound in contact with ground plates 24, the spacers 26 passing through clearance openings in the charge plates.

A single voltage power pack 30 has a +12 kv. terminal connected to the ionizer wires, and has its negative terminal grounded and connected to the ground collector plates 24 and to the non-discharging ionizer electrodes 19. A variable resistor 31 may be connected across the output terminals of the power pack for controlling the current flow therefrom.

Some of the charge collector plates are aligned with the ionizer wires, and those plates have portions which extend into the ionizer area, and have formed on their upstream ends rod-like or bulbular portions 33 which have substantially greater diameters than those of the ionizer wires. Such charge plate portions 33 form auxiliary non-discharging ionizer electrodes.

In the operation of Figs. 1 and 2, when the power pack 30 is first turned on, ionizer current will flow between the charge plate portions 33 and the ionizer wires until the capacitor formed by the charge and ground collector plates is charged following which such ionization will cease until leakage of the charge occurs as through leakage resistance or as caused by a charged dust particle moving from one plate to another. The charge plates will remain at the voltage to which the plate capacitance is charged. This voltage could be varied by varying the spacing between the ionizer wires and the charge plate portions 33 but there is no need for providing such an adjustment since for a particular design of precipitator one spacing is most effective and should not be changed.

Otherwise, the precipitator performs in a conventional manner, the ionization between the wires 18 and the main non-discharging ionizer electrodes 19 providing positive electrostatic charges on the dust particles entering the inlet 11 so that such dust particles will deposit upon the ground collector plates.

Since the charge plate portions 33 extend into the electrostatic fields between the ionizer wires and the main non-discharging ionizer electrodes, they interfere somewhat with the dust charging. In the embodiment of this invention illustrated by Figs. 3 and 4, this interference with dust charging is avoided by providing a separate ionizer wire 36 supported between the insulators 37 from the end walls of the casing at the outlet end of the precipitator, and by providing the downstream end of one of the charge collector plates with an enlarged rounded portion 38 adjacent the wire 36. The wire 36 would be connected to the positive terminal of the power pack 30 as would be the main ionizer wires in the usual upstream ionizer.

In the operation of Figs. 3 and 4, the charge plates would be charged to a voltage resulting from ionization current flowing between the wire 36 and the plate portion 38 until the collector plate capacitance is charged as in the case of the plate charging operation of Figs. 1 and 2.

In the embodiments of Figs. 1-4, the enlarged rounded charge plate portions have been placed in alignment with ionizer wires. They may, however, be arranged between the ionizer wires and the main non-discharging ionizer electrodes as illustrated by Figs. 5 and 6.

In Fig. 5, one of the charge plates 23 is provided with an enlarged rounded portion 40 inwardly of the space between the ionizer wire and one of the non-discharging ionizer electrodes.

In Fig. 6, a pair of charge plates have oppositely faced depressions adjacent their upstream ends, and have the inner ends of an inverted Y-like support 41 held by spring action in such depressions. An enlarged rounded conductor 42 is formed on the outer end of the support 41, and is located inwardly of the space between an ionizer wire and a non-discharging ionizer electrode.

If the auxiliary non-discharging electrodes connected to the charge plates were probes disconnected from the charge plates, they would take on charges by induction, or more correctly, polarization, the voltage of such a charge depending upon the geometrical location of the probe in the electrostatic field. When such an auxiliary non-discharging ionizer electrode is connected to a charge plate, the action is more involved since ionization current must flow in order that the capacitor formed by the collector plates can be charged. Such an auxiliary non-discharging ionizer electrode when connected to a charge plate is connected in series with a capacitance to ground, and its potential is dependent upon a sort of a bleeder effect as well as its distance from an ionizer wire, since there is a voltage drop from the ionizer wire to ground in a series circuit including the space between the auxiliary electrode and the plate capacitance.

It is a simple matter to determine the correct spacing between such an auxiliary electrode and an ionizer wire since it involves no more than adjusting such spacing in an experimental model until the desired potential on the charge plates is provided. Then, commercial models of the same size and having the same characteristics would use the same spacing.

While embodiments of this invention have been described for the purpose of illustration, it should be understood that the invention is not limited to the exact apparatus and arrangement of apparatus illustrated, since modifications thereof may be suggested by those skilled in the art, without departure from the essence of the invention.

What is claimed, is:

1. An electrostatic precipitator comprising an upstream ionizer wire, a plurality of parallel, spaced apart collector plates having upstream edges extending parallel to said wire downstream of same, alternate of said plates being grounded and the others of said plates being insulated from ground, and a single voltage power pack connected to said wire and grounded plates only, a plurality of said other plates having upstream edges which extend closer to said wire than do the upstream edges of said grounded plates, said plurality of other plates being charged by the flow of ionization current between their upstream edges and said wire.

2. An electrostatic precipitator comprising an ionizer wire, main non-discharging ionizer electrodes on opposite sides of said wire, ground collector plates connected to said electrodes, charge collector plates insulated from said ground plates, a single voltage power pack connected to said wire and electrodes, and an auxiliary non-discharging electrode connected to said charge plates and supported adjacent said wire whereby ionization current can flow between said wire and said auxiliary electrode.

3. An electrostatic precipitator as claimed in claim 2 in which the auxiliary electrode is an extension of one of said charge plates.

4. An electrostatic precipitator as claimed in claim 2 in which one of said charge plates is in alignment with said wire, and said auxiliary electrode is an extension of said one plate.

5. An electrostatic precipitator as claimed in claim 2 in which the auxiliary electrode extends into the electrostatic field between one of said main electrodes and said wire.

6. An electrostatic precipitator as claimed in claim 5 in which means is provided for supporting said auxiliary electrode from a pair of said charge plates.

7. An electrostatic precipitator comprising a main ionizer wire, main non-discharging ionizer electrodes on opposite sides of said wire, ground collector plates connected to said electrodes, charge collector plates insulated from said ground plates, a single voltage power pack connected to said wire and main electrodes, an auxiliary ionizer wire connected to said power pack, and an auxiliary non-discharging ionizer electrode connected to said charge plates and supported adjacent said auxiliary wire whereby ionization current can flow between said auxiliary wire and said auxiliary electrode.

8. An electrostatic precipitator as claimed in claim 7 in which the main ionizer wire and the main auxiliary electrodes are located upstream of the collector plates, and the auxiliary wire and auxiliary electrode are located downstream of the collector plates.

References Cited in the file of this patent

UNITED STATES PATENTS

| | | |
|---|---|---|
| 1,400,795 | Bradley | Dec. 20, 1921 |
| 2,008,246 | Deutsch | July 16, 1935 |